United States Patent Office 3,215,637
Patented Nov. 2, 1965

3,215,637
PROCESS FOR THE PROTECTION OF METALS AGAINST THE CORROSIVE ACTION OF BRINES
Lucien Camille Clerbois, Brussels, Belgium, assignor to Solvay & Cie, Brussels, Belgium, a corporation of Belgium
Filed Aug. 29, 1963, Ser. No. 305,484
3 Claims. (Cl. 252—387)

This application is a continuation-in-part of my copending application Serial No. 36,450 filed June 15, 1960 and now abandoned.

The present invention is concerned with a process for the protection of metals and alloys against the corrosive action of brines such as calcium chloride and sodium chloride.

The main uses of calcium chloride and sodium chloride give rise to corrosion problems. Corrosion depends on the nature of the metals in contact, on the nature of the brine, the oxygen content, the temperature, the pH and the presence of inhibitors in the solutions.

Many formulae of inhibiting compositions have been proposed. However it is difficult to appreciate their relative efficiency in connection with corrosion by brines and to give a general solution to the several problems which arise for the following reasons:

The high chloride content of the brines limits the applicability of some common inhibitors; this is the case with sodium nitrite, whose effective concentration should be equivalent to the chloride concentration.

Some inhibitors owe their value to their reducing characters; they react with dissolved oxygen thus eliminating the chief corrosive agent. Hydrazine, pyrogallol and sulphite belong to this category; their efficiency is dependent however on the aeration conditions of the brines.

Many inhibitors, although non-reducing, are efficient only when used in a de-aerated solution. Zinc salts, and in particular the chloride, have a limited efficiency and cause corrosion at the immersion line.

The efficiency of the chromates and bichromates has long been recognized. However, corrosion by pitting is the major inconvenience of these inhibitors. In order to remedy this, great quantities must be used.

On account of its colloidal properties, sodium silicate has an inhibitory influence on the corrosion of steel, aluminum, and zinc in contact with aqueous solutions. However, its inhibitory action is rather small in sodium chloride and calcium chloride brines and localized corrosion frequently occurs. When the sodium silicate content is too small, corrosion may actually be accelerated. For the inhibitor to have an appreciable action on the corrosion of steel by brines, the concentration of sodium silicate should be more than 2 gr./l.

In conclusion, no simple composition has proved completely satisfactory and it has been necessary to use complex compositions in order to insure both high inhibitory power and the prevention of any localized corrosion.

It is accordingly an object of the invention to provide an effective and efficient method for protecting metals and alloys against the corrosive action of calcium chloride and/or sodium chloride solutions. In accordance with the invention it has been found that the introduction of a mixture of sodium silicate and zinc chloride in selected proportions effectively inhibits corrosion by sodium chloride and calcium chloride brines. The corrosion inhibiting effect of the mixture of sodium silicate and zinc chloride has been found to be substantially greater than the additive effects of sodium silicate and zinc chloride alone. The greater effectiveness of the combination makes it possible to obtain satisfactory protection with smaller quantities of the inhibitors. Concentrations of the sodium silicate-zinc chloride mixtures of about 1 to 2 grams per liter of salt brine have been found most effective and economical in prevention of corrosion. A sodium silicate-zinc chloride composition in dilute solution is preferable because it keeps the metal in a remarkable state of cleanliness.

The addition of this inhibitory mixture to calcium and/or sodium chloride brines is particularly interesting because it allows solution of the corrosion problem in all the fields of application where such brines are used, namely the preparation of brines for refrigerating purposes, concrete foundation operations, the drying of gases, and the spraying of such brines as anti-freeze for the melting of ice and snow. Such addition is particularly suitable for products containing calcium chloride used for the stabilization of salts and for the anti-dust treatment of roads, playgrounds, sports fields, underground or surface mining, and for ashes from electric power stations and from any industrial dusty products, especially solid fuels such as coals, cokes, egg coal, briquettes and lignite briquettes.

By adding these inhibitors, one effectively reduces the corrosion of any metallic surfaces brought into contact with these solutions themselves or with products treated by these solutions.

The products containing calcium chloride used for the anti-dust treatment may contain, besides the inhibitor, a wetting agent such as alkylcellulose, polyvinyl alcohols, polyoxypropylene glycol derivatives and polyoxyalkenes which ensures fixing the dust particles over the whole surface treated. The inhibitors may be added to the salt in the solid state, so that the preparation of the solutions and their subsequent use will entail little or no corrosion. They can also be added when the solid product is being dissolved or at any other stage of its use.

The invention will be more fully understood from the following description in conjunction with the accompanying drawings in which.

Figure 1:
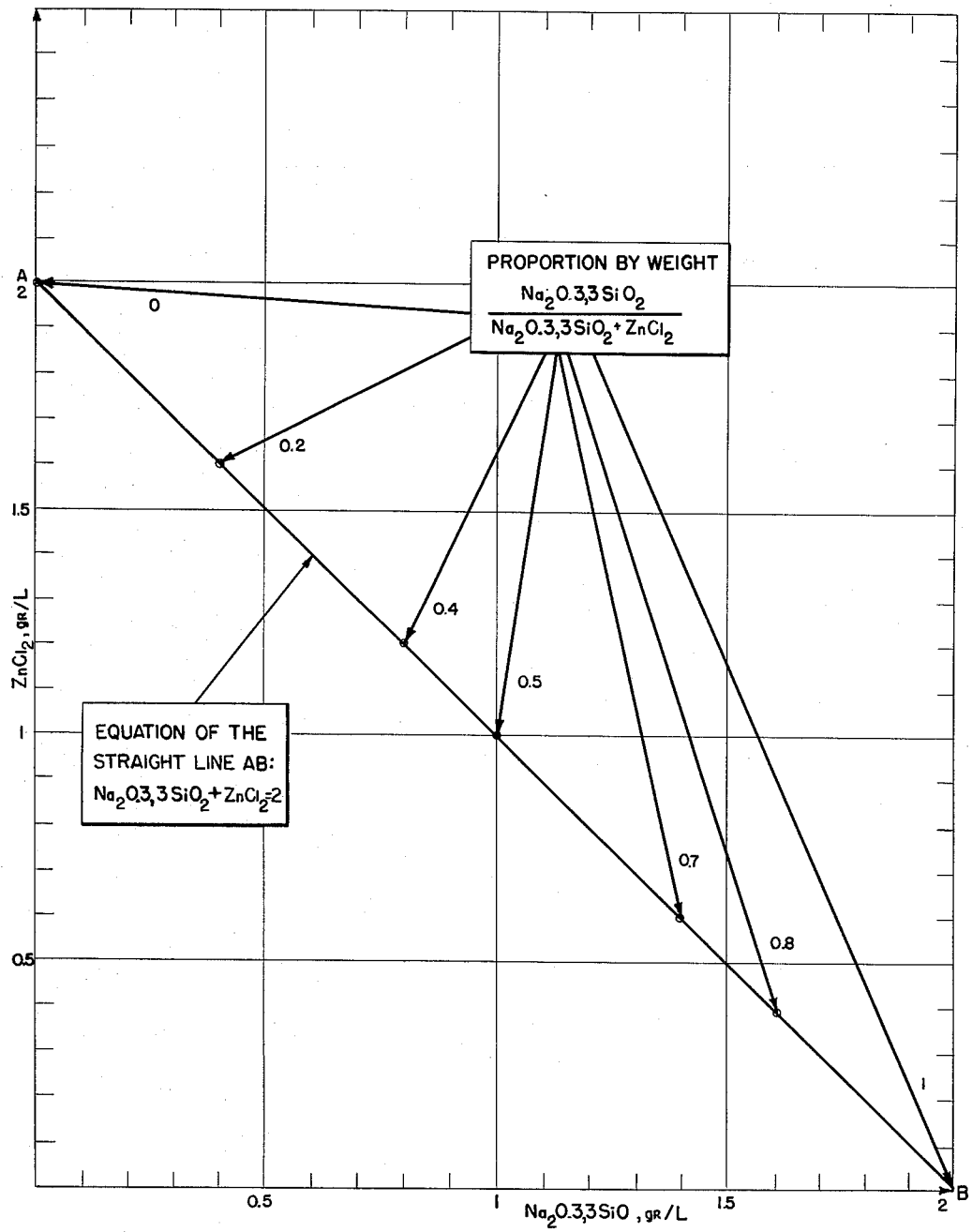
FIG. 1 is a graph showing different proportions by weight of sodium silicate having the empirical formula $Na_2O3.3SiO_2$ and zinc chloride.

The straight line A–B of FIG. 1 corresponds to the quantity of inhibiting mixture equal to 2 gm./l. of brine. From this curve it is possible to determine the quantities of sodium silicate and zinc chloride to be used for the proportions illustrated in FIG. 2.

Figure 2:
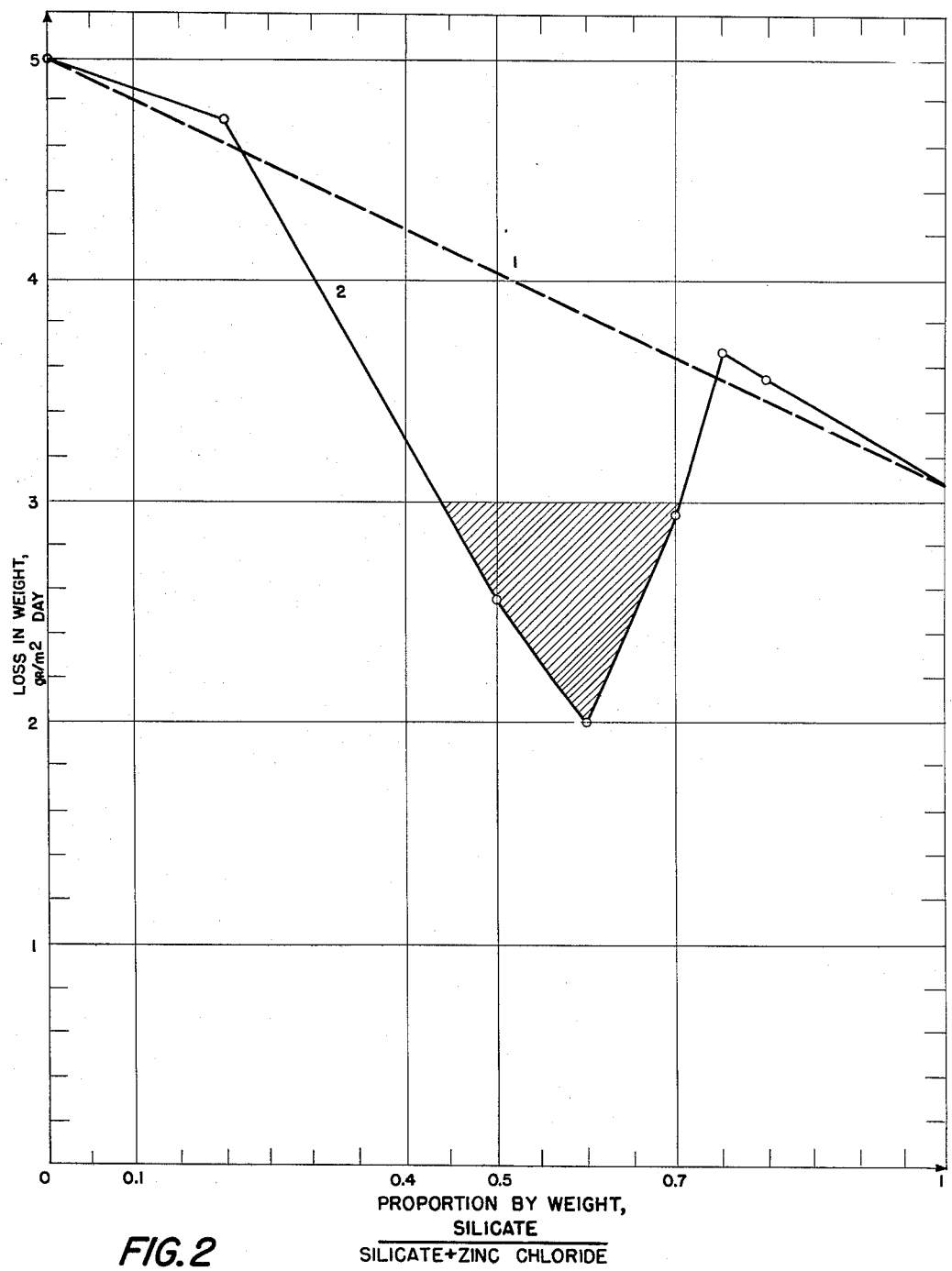
FIG. 2 is a graph showing the effectiveness of different proportions in preventing corrosion.

In FIG. 2, the broken line represents the corosion inhibiting effect that would be expected from a mixture of sodium silicate having the empirical formula $Na_2O3.3SiO_3$ and zinc chloride when the total quantity of the mixture used is two grams per liter of solution. The solid line represents the corrosion inhibiting effect actually obtained in accordance with the process of the invention. The values plotted represent the loss of weight by corrosion of steel in a brine of 200 grams of calcium chloride per liter as follows:

| Ratio of Sodium Silicate to Mixture | Sodium Silicate, gr./l. | Zinc Chloride, gr./l. | Loss in Weight, gr./m²/day |
|---|---|---|---|
| 0 | 0 | 2.0 | 5 |
| 0.2 | 0.4 | 1.6 | 4.7 |
| 0.4 | 0.8 | 1.2 | 3.27 |
| 0.5 | 1.0 | 1.0 | 2.53 |
| 0.6 | 1.2 | 0.8 | 2.0 |
| 0.7 | 1.4 | 0.6 | 2.95 |
| 0.75 | 1.5 | 0.5 | 3.63 |
| 0.8 | 1.6 | 0.4 | 3.53 |
| 1.0 | 2.0 | 0.0 | 3.1 |

It will be seen that when the proportion of sodium silicate to the mixture is between the values of approximately 0.25 to 0.75 the actual loss of metal as shown by the solid line in FIG. 2 is less than the expected loss as represented by the broken line. The hatched area in FIG. 2 represents the zone of greatest synergistic effect. The limits of this zone correspond to a silicate/silicate-chloride ratio of about 0.4 to 0.7. By reference to FIG. 1, the corresponding quantities of sodium silicate and zinc chloride for the desired proportions can be easily found.

In some conditions, the effectiveness of the inhibitor can be further enhanced by the addition of sodium chromate. However, if the quantity of chromate is insufficient, localized corrosion can be produced. The minimum concentration required depends on the area of the surfaces to be protected. It should not be less than 5 gr. of sodium chromate per square meter of surface. If this area cannot be evaluated beforehand, it is safer to use only the binary mixture.

*Corrosion tests.*—The sodium chloride brines are prepared from crude salt at a NaCl concentration of 989.6 gr./kgr. The calicum cholride brines are obtained from flakes with a $CaCl_2$ content of 770–800 gr./kgr.

The test-pieces having the following dimensions, 50 x 25 x 1 mm. are in mild steel; they are initially cathodically etched at 60–65° C. in about 5 N sulphuric acid, the current intensity being about 10 amperes.

During the corrosion tests, the test-piece initially weighed, are hung from glass hooks and completely immersed in flasks containing the brine and submitted to continual agitation; ventilation of the solutions is ensured by openings provided in the stoppers. The temperature is maintained at 20° C. After a test period of 10 days, the test-pieces are etched and weighed again. To prevent dissolving the metal during etching, there is added to the etching bath 50—cm.$^3$ of formol at 40% per liter of 5 N sulphuric acid.

The corrosion speeds are expressed in gr./m.$^2$ per day the inhibitory power of the additives is given in percent by the formula:

$$\text{inhibitory power} = \frac{A - B}{A}$$

where A and B are the respective corrosion speeds without and with the inhibitor.

Table 1 gives the results of the tests.

*Table 1*

| Brine | Additions, gr./l. | | | Loss in weight, gr./m.$^2$/day | Inhibitory power |
|---|---|---|---|---|---|
| | Sodium silicate | Zinc chloride | Sodium chromate | | |
| Crude sodium chloride, 50 gr./l. | ---- | ---- | ---- | 14.45 | ---- |
| | 0.25 | | | 19.80 | −37.0 |
| | 0.50 | | | 20.40 | −41.0 |
| | 1.00 | | | 6.05 | +58.0 |
| | 2.00 | | | 4.70 | +67.0 |
| | 4.00 | | | 3.74 | +74.0 |
| | 0.50 | 0.50 | | 0.88 | +94.0 |
| | 1.00 | | 0.50 | 1.25 | +91.0 |
| | 0.50 | 0.50 | 0.50 | 0.25 | +98.3 |
| | 0.50 | 0.50 | 0.25 | 0.48 | +96.7 |
| | 0.50 | 0.50 | 0.10 | 0.42 | +97.1 |
| | 1.00 | 0.50 | 0.25 | 0.66 | +95.4 |
| | 1.00 | 0.50 | 0.10 | 0.49 | +96.6 |
| Calcium chloride in flakes, 70 gr./l. | ---- | ---- | ---- | 22.60 | ---- |
| | 0.25 | | | 25.25 | −12.0 |
| | 0.50 | | | 16.30 | +28.0 |
| | 1.00 | | | 15.80 | +30.0 |
| | 2.00 | | | 5.23 | +77.0 |
| | 4.00 | | | 5.18 | +77.0 |
| | 0.50 | 0.50 | | 1.52 | +93.0 |
| | 1.00 | | 0.50 | 3.55 | +84.0 |
| | 0.50 | 0.50 | 0.50 | 0.96 | +95.7 |
| | 0.50 | 0.50 | 0.25 | 0.51 | +97.7 |
| | 0.50 | 0.50 | 0.10 | 0.59 | +97.4 |
| | 1.00 | 0.50 | 0.25 | 0.71 | +96.9 |
| | 1.00 | 0.50 | 0.10 | 0.73 | +96.8 |

From the tests that have been made it has been determined that the proportions of materials to be used is the ternary combination should be in the following range: sodium silicate about 30% to 65%; zinc chloride about 30% to 45%; sodium chromate about 5% to 35%. All proportions are by weight. Preferably the mixture contains approximately equal amounts of sodium silicate and zinc chloride and approximately half as much sodium chromate.

In refrigeration plants the calcium chloride brine is often is contact not only with steel and cast iron, but also with copper and galvanized sheet. The simultaneous presence of these different metals creates galvanic couples whose anodic surfaces are more quickly corroded.

The tests have shown that inhibitors containing sodium silicate, zinc chloride and sodium chromate, exert a very favorable influence on this particularly dangerous form of corrosion.

The experimental arrangement consists of two glass cells, closed at the bottom by the metal test-pieces to be tested, which have previously been polished and rinsed in acetone. The two cells are connected by a siphon in plastic material. They are each provided with 125 cc. of a brine containing 200 gr. $CaCl_2$ in flakes per liter; in each of them air is bubbled at the rate of 5 l./hours. The anode and cathode are electrically coupled by a resistance of 3800 ohms on the contacts of which a high impedance electronic voltmeter measures the potential difference. The galvanic intensity can thus be calculated.

Table 2 summarizes the results obtained. It is seen that the galvanic corrosion of steel coupled with copper which may be very dangerous, is effectively prevented both by the binary formulae "sodium silicate-zinc chloride" and by the ternary mixtures containing sodium chromate.

*Table 2.—Influence of inhibitors containing sodium silicate on the galvanic corrosion of steel, copper and zinc in the $CaCl_2$ brine*

| Couple | Additions, gr./l. | | | Intensity of galvanic current after 2 h. 30 m./μA. | Inhibitory Power Percent |
|---|---|---|---|---|---|
| | Sodium silicate | Zinc chloride | Sodium chromate | | |
| Steel-copper | ---- | ---- | ---- | 32 | ---- |
| | 0.5 | 0.5 | | 5 | 84 |
| | 0.5 | 0.5 | 0.2 | 4 | 87 |
| Copper-zinc | ---- | ---- | ---- | 34 | ---- |
| | 0.5 | 0.5 | | 12 | 65 |
| | 0.5 | 0.5 | 0.2 | 13 | 62 |

What I claim is:

1. A process for the protection of metals and alloys against the corrosive action of a member of the group consisting of calcium chloride brines and sodium chloride brines, which comprises combining with said brines from about 1 to 2 grams per liter of said brines, of an inhibiting mixtures consisting essentially of sodium silicate having the empirical formula $Na_2O_3 \cdot 3SiO_2$ and zinc chloride wherein the proportion by weight of sodium silicate to the mixture of sodium silicate+zinc chloride is about 0.4 to 0.7.

2. A process according to claim 1, in which about 5% to 35% of sodium chromate by weight is added to the mixture of sodium silicate and zinc chloride.

3. A process for the protection of metals and alloys against the corrosive action of a member of the group consisting of calcium chloride brines and sodium chloride brines, which comprises combining with said brines from about 1 to 2 grams per liter of said brines of an inhibiting mixture consisting essentially of sodium silicate having the empirical formula $Na_2O_3 \cdot 3SiO_2$, zinc chloride and sodium chromate in the following proportions by weight: sodium silicate about 30% to 65%; zinc chloride about 30% to 45%; sodium chromate about 5% to 35%.

References Cited by the Examiner

UNITED STATES PATENTS 1,844,999   2/32   White _____ 252—387 XR
2,207,767   7/40   Turner _____ 252—387 XR
2,695,876   11/56   Faress _____ 252—387 XR JULIUS GREENWALD, *Primary Examiner.*